(12) United States Patent
Ivov et al.

(10) Patent No.: US 10,171,536 B2
(45) Date of Patent: Jan. 1, 2019

(54) RAPID OPTIMIZATION OF MEDIA STREAM BITRATE

(71) Applicant: ATLASSIAN PTY LTD, Sydney (AU)

(72) Inventors: Emil Ivov, Austin, TX (US); Boris Grozev, Austin, TX (US); Georgios Politis, Austin, TX (US)

(73) Assignee: ATLASSIAN PTY LTD, Sydney (AU)

( * ) Notice: Subject to any disclaimer, the term of this patent is extended or adjusted under 35 U.S.C. 154(b) by 0 days.

(21) Appl. No.: 15/282,858

(22) Filed: Sep. 30, 2016

(65) Prior Publication Data

US 2018/0097863 A1    Apr. 5, 2018

(51) Int. Cl.
*G06F 15/16* (2006.01)
*H04L 29/06* (2006.01)

(52) U.S. Cl.
CPC ........ *H04L 65/601* (2013.01); *H04L 65/1069* (2013.01); *H04L 65/403* (2013.01); *H04L 65/80* (2013.01); *H04L 67/42* (2013.01)

(58) Field of Classification Search
CPC . H04L 65/601; H04L 65/1069; H04L 65/403; H04L 65/80; H04L 67/42
See application file for complete search history.

(56) References Cited

U.S. PATENT DOCUMENTS

| | | | | |
|---|---|---|---|---|
| 5,835,495 A | * | 11/1998 | Ferriere | H04L 29/06 348/E5.008 |
| 2005/0044503 A1 | * | 2/2005 | Richardson | H04L 12/1818 715/753 |
| 2005/0226172 A1 | * | 10/2005 | Richardson | H04L 12/1813 370/260 |
| 2008/0043644 A1 | * | 2/2008 | Barkley | H04Q 11/00 370/261 |
| 2009/0231415 A1 | * | 9/2009 | Moore | H04N 7/152 348/14.09 |

(Continued)

OTHER PUBLICATIONS

Rosenberg et al., "SIP: Session Initiation Protocal", Network Working Group, dated Jun. 2002, 269 pages.

(Continued)

*Primary Examiner* — Richard G Keehn
(74) *Attorney, Agent, or Firm* — Hickman Palermo Becker Bingham LLP (57) ABSTRACT

A data processing method comprises, using a media server during a first media session between a client device and the media server, determining a stable bitrate value for use as a rate of transmitting multimedia data from the client device to the media server; storing, in a database, the stable bitrate value for the client device in association with an identifier; receiving, from the client device, a request to establish a second media session; determining the identifier within the request; in response to the request, based on the identifier in the request, searching the database for the stable bitrate value that is associated with the identifier; in response to locating the stable bitrate value in the database, sending the stable bitrate value to the client device for use in estimating a bitrate for transmitting multimedia from the client device to the media server in the second media session; establishing, by the media server, the second media session, wherein the media server initially receives multimedia data from the client device at the stable bitrate.

16 Claims, 4 Drawing Sheets

(56) References Cited

U.S. PATENT DOCUMENTS

| | | | | |
|---|---|---|---|---|
| 2011/0196962 A1* | 8/2011 | Radier | ............ | H04W 4/02 |
| | | | | 709/224 |
| 2011/0310216 A1* | 12/2011 | Lee | ............ | H04N 7/15 |
| | | | | 348/14.08 |
| 2011/0310217 A1* | 12/2011 | Lee | ............ | H04N 7/15 |
| | | | | 348/14.08 |
| 2014/0267568 A1* | 9/2014 | Star | ............ | H04L 12/1818 |
| | | | | 348/14.08 |
| 2015/0296254 A1* | 10/2015 | Moore | ............ | H04N 21/4622 |
| | | | | 725/31 |
| 2016/0156676 A1* | 6/2016 | Verin | ............ | H04L 65/1016 |
| | | | | 709/228 |
| 2016/0360265 A1* | 12/2016 | Flick | ............ | H04N 21/435 |

OTHER PUBLICATIONS

Holmer et al., "A Google Congestion Control Algorithm for Real-Time Communication draft-ietf-rmcat-gcc-01", Networking Group, dated Oct. 19, 2015, 18 pages.

Grozev et al., "Last N: Relevance-Based Selectivity for Forwarding Video in Multimedia Conferences", NOSSDAV'15, Mar. 18-20, 2015, Portland, 6 pages.

Beda et al., "XEP-0176:Jingle ICE-UDP Transport Method", XMPP Standards Foundation, dated 1999-2016, 28 pages.

\* cited by examiner

RAPID OPTIMIZATION OF MEDIA STREAM BITRATE

TECHNICAL FIELD

The technical field of the present disclosure is computer hardware, software and computer systems for rapid optimization of media stream bitrate during a multimedia session. The technical field of the disclosure also is computer hardware, software and systems that are programmed for rapid optimization of media stream bitrate during a multimedia session.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The popularity of multimedia sessions, such as media streams, is constantly increasing as shown by the increasing use of video conferences, video phone calls, streaming of live television, streaming of previously recorded events, Internet radio, and the like. Each of these services requires transferring a different amount of data between the two or more parties involved in the multimedia session. Bitrate is a measure of the number of bits that are conveyed or processed per unit of time. Certain qualities of media require different bitrates. Some common examples, in approximate terms, are: telephone quality audio: 8 kilobits/sec; Compact Disc quality audio: 1,400 kilobits/sec; 240 p video using the H.264 video compression standard: 400 kilobits/sec; 480 p video using H.264: 1 megabit/sec; 720 p video using H.264: 2.5 megabits/sec to 3.8 megabits/sec; 1080 p video using H.264: 4.5 megabits/sec to 6.8 megabits/sec. H.264 is a popular video compression standard. 240 p, 480 p, 720 p, and 1080 p are common video resolutions, in which the p stands for progressive scan.

A given multimedia session may take place using varying bitrates based, for example, on a maximum stable speed that each device participating in the multimedia session can maintain. As an example, consider a video stream that begins at 240 p and gradually increases to 1080 p over a period of time. Typically, when beginning a media session, all devices that connect to a given media server are treated the same, and therefore all the multimedia sessions start at a default bitrate and increase over time. However, not all devices, and their Internet connections, are the same. Additional solutions are needed to improve the user experience.

DETAILED DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Computer-implemented techniques are provided for rapid optimization of media stream bitrates. Specifically, during a first media session between a client device and a media server, the media server determines a stable bitrate for the client device. The stable bitrate may be determined using any suitable method at predetermined time intervals during the media session, continuously, or in any other manner. The stable bitrate, along with an identifier for the client (such as an Internet Protocol (IP) address) is stored in a database. Additional information may also be stored, such as an identifier for the media server (such as an IP address), and/or a timestamp. The stable bitrate may be stored at any point during the media session, such as when the media session ends, or when the connection has stabilized for a predetermined amount of time. Then, when the client device subsequently connects for a second media session, the stable bitrate is retrieved from the database, and sent to the client device for use as the starting value in bitrate estimation. This greatly decreases the "ramp-up" time commonly seen in bitrate estimation, and improves the user experience by beginning with streaming media at the last stable bitrate for the given client and/or media server combination.

In some embodiments, a client device may both send and receive data during a media session, such as during a video or audio call or conference. Thus, there may be two separate bitrates involved in a media session: an upload or egress bitrate that measures the rate at which a client can send data to a media server, and a download or ingress bitrate that measures the rate at which a client can receive data from a media server. Due to Internet connections typically being asymmetric, the egress and ingress bitrates may be different. In the following specification, the stable bitrate refers to the upload rate at which a client can send data to a media server.

A data processing method comprises, using a media server during a first media session between a client device and the media server, determining a stable bitrate value for use as a rate of transmitting multimedia data from the client device to the media server; storing, in a database, the stable bitrate value for the client device in association with an identifier; receiving, from the client device, a request to establish a second media session; determining the identifier within the request; in response to the request, based on the identifier in the request, searching the database for the stable bitrate value that is associated with the identifier; in response to locating the stable bitrate value in the database, sending the stable bitrate value to the client device for use in estimating a bitrate for transmitting multimedia data between the media server and the client device in the second media session; establishing, by the media server, the second media session at the stable bitrate.

Other embodiments, aspects and features will become apparent from the disclosure as a whole.

Example Computer System Implementation

Figure 1:
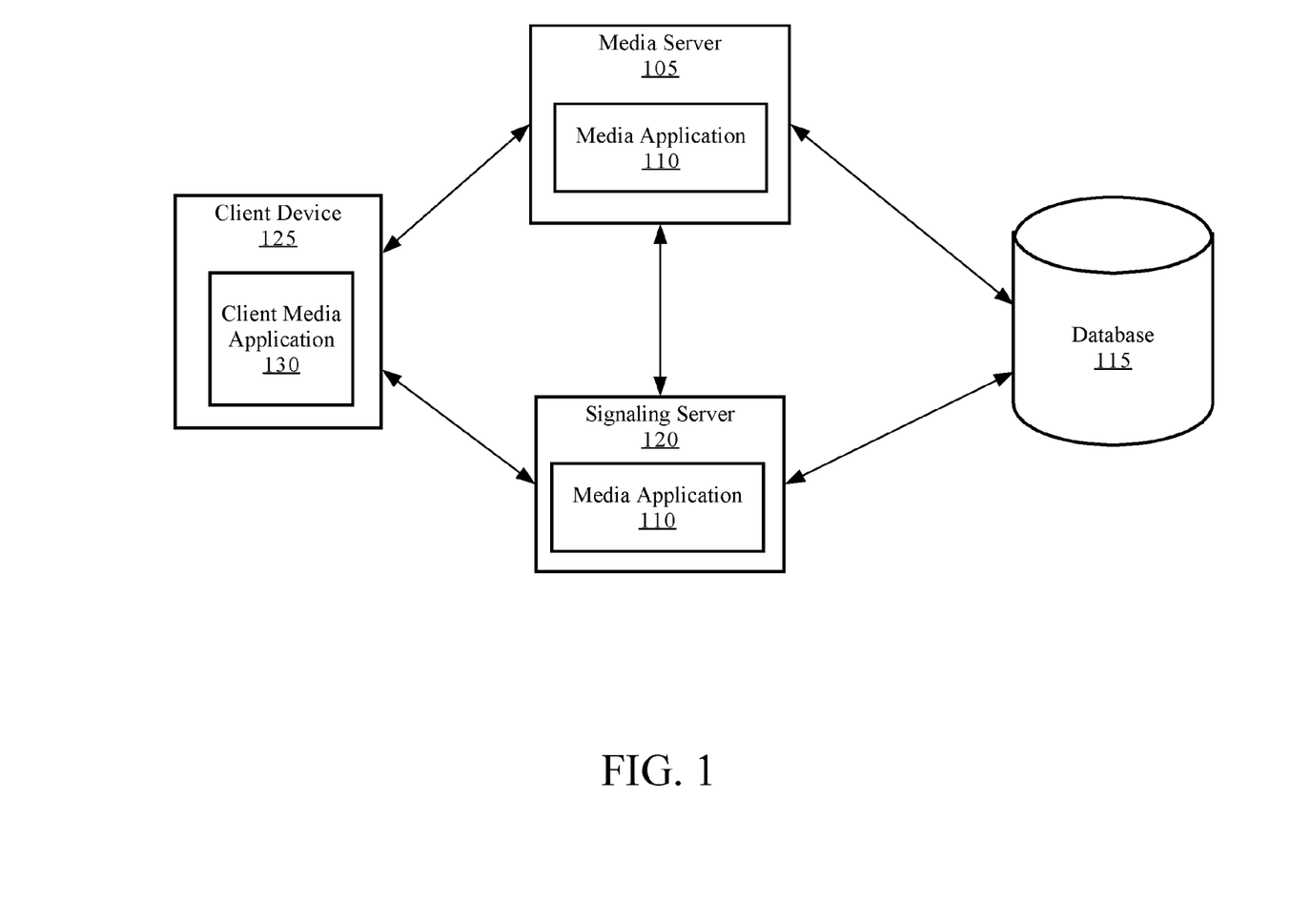
FIG. 1 illustrates an example computer system in which the techniques described may be practiced, according to one embodiment.

FIG. 1 illustrates an example computer system in which the techniques described may be practiced, according to one embodiment. In an embodiment, a computer system comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a media server 105, a media application 110, a database 115, a signaling server 120, a client device 125, and a client media application 130. Media server 105 may be any computing device, including but not limited to: server computers, work stations, personal computers, general purpose computers, laptops, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, or network infrastructure devices including, but not limited to, routers, switches, and other computing and/or infrastructure devices.

Although a single media server 105 is depicted in FIG. 1, any number of media servers, spanning one or more physical devices, may be used. Optionally, media server 105 may be located on the same physical device as database 115 and/or signaling server 120.

Media server 105 is communicatively connected to database 115, signaling server 120, and/or client device 125 using any wired and/or wireless connection, such as any combination of a Local Area Network (LAN), a Wide Area Network (WAN), an internetwork, the public Internet, or a company network.

Media server 105 may serve any type of multimedia to any number of client devices. In one embodiment, media server 105 is configured to provide video conferencing capabilities. Specifically, media server may be a multipoint control unit (MCU) or a selective forwarding unit (SFU). MCUs receive and process audio and video data from clients and typically mix the audio and video to create a single composite video. The composite video is then streamed to the clients in a single mix. While this solution enables relatively simple client software, the processing power needed for the MCU is high, and the resulting presentation at the client is generally inflexible. SFUs, in contrast, are more similar to packet data routers, as SFUs forward packets without media processing.

In one embodiment media server 105 executes the media application 110. While one media application 110 is shown for purposes of illustrating a clear example, other embodiments may execute multiple applications. In an embodiment, the media application 110 is used for audio or video conferencing, or any other type of media session. Additional instances of media application 110, and/or different versions of media application (such as a client version), may optionally execute on client device 125 to provide some of the functionality needed to implement this invention.

In one embodiment, media application 110 comprises program instructions that are programmed or configured to establish a media session and exchange media using the session. The media session may use, for example, the Interactive Connectivity Establishment (ICE) (defined in RFC 5245), or any other method and/or standard. Media application 110 may establish any number of media sessions simultaneously, such as hosting or participating in an audio or video conference with five, ten, or more client devices. A second instance of media application 110 may also execute on signaling server 120, as discussed below.

In one embodiment, media application 110 comprises program instructions that are programmed or configured to estimate available bandwidth and determine a stable bitrate for a media session. During a media session, media application 110 estimates available bandwidth periodically, such as every minute or other suitable interval, although the frequency may vary, such as based on the age of a media session. For example, estimation may occur more frequently at the start of a media session. The bandwidth may be estimated using any suitable method, such as detecting anomalies (such as packet loss), or the lack thereof. One method of bandwidth estimation and congestion control is described in the second draft of the "A Google Congestion Control Algorithm for Real-Time Communication," available from the Internet Engineering Task Force (IETF) in the document "draft-alvestrand-rtcweb-congestion-02" in the folder "html" of the domain toolsietf.org. The reader or user of the present disclosure is presumed to have read and understood the document cited in the preceding sentence.

A stable bitrate value for a media session is a bitrate value for a media session that has been consistently stable for a period of time. In particular, media application 110 determines a stable bitrate value based on satisfying the three following formulas, where R is equal to the stable bitrate, BWE is the current bandwidth estimation, and C1, C2, and C3 are time periods:

1.) BWE>=R for the last C1 time;
2.) Actual Receiving Rate>=R for the last C2 time; and
3.) BWE has been non-decreasing for the last C3 time.

In the above formulas, C1, C2, and C3 may be any amount of time, such as 20 seconds, 1 minute, or any other suitable amount. Further, C1, C2, and C3 may be the same or different amounts of time, may vary dynamically, and are individually configurable by a user, administrator, programmer, or other suitable entity. Alternatively, media application 110 may determine a stable bitrate by satisfying one of the above formulas, two of the above formulas, or using any other standard for determining a stable bitrate.

In one embodiment, media application 110 comprises program instructions that are programmed or configured to determine identifying information for the media session and store the stable bitrate and identifying information for the media session. Media application 110 may determine identifying information using any available method. Identifying information may be any data that is able to identify a particular client device, media server, or other device used in a media session. In particular, IP addresses for a particular media server and client device involved in a media session are identified.

Further, a timestamp may also be determined and included in the identifying information. The timestamp indicates a time when the bitrate was determined to be stable and/or when the stable bitrate was stored in the database. The stable bitrate and identifying information may be stored in a database in any suitable manner, by any component. For example, media application 110 may send the stable bitrate and identifying information to a database management application (not shown) which subsequently stores the data in the database. The stable bitrate and identifying information may be stored in any order, such as (timestamp, client IP, server IP, stable bitrate). Alternatively, more or less data may be stored.

In one embodiment, media application 110 comprises program instructions that are programmed or configured to search the database for a stable bitrate. In response to media application 110 receiving a request for a new media session, media application determines identifying information for the media session, such as a client IP address and a media server IP address, and uses this information to search database 115. Media application 110 may search database 115 by sending a request to a database management application to perform the search, and receiving the results of the search, if any, in response. If the search of database 115 is successful, a stable bitrate will be returned for the client device. If the search of database 115 is unsuccessful, no stable bitrate will be identified, which may indicate that the client is a new client device or that all previous records of a stable bitrate have expired.

Optionally, the search of database 115 may require that the timestamp associated with the bitrate is recent within a threshold amount of time. The threshold may be set by a user, administrator, programmer or other suitable entity to any amount of time. For example, the threshold may be 1 day, 10 days, 2 weeks, etc. Optionally, the threshold may be based upon data, such as usage statistics or how frequently particular clients connect to a media server using different devices and/or Internet connections, and may vary on a per client basis.

In one embodiment, information in database 115 may be matched using exact matches or partial matches. An example of an exact match is when the client IP address and the media server IP address in the database exactly match the values for the new media session. An example of a partial match is when a network prefix matches the network prefix of the client and/or media server for the new media session. A network prefix match would allow, for example, a client device to have a stable bitrate associated with Server 1 even if the client device has only previously connected with Server 2, provided that Server 1 and Server 2 are hosted on the same network. Network prefix matching may match at the/24 level, for example, or other bit levels or prefix lengths.

In one embodiment, media application 110 comprises program instructions that are programmed or configured to send and/or receive requests, messages, and/or data as needed to establish a media session and exchange media using the media session. The requests, messages, and/or data may be sent in any format and in any manner. In particular, media application 110 sends the stable bitrate to the client device, and other information needed to begin a media session, such as an IP address of the media server, in response to a request to establish a new media session.

In one embodiment, database 115 is any form of digital data storage repository, such as a relational database, flat file, CSV file, simple network management protocol (SNMP) management information base (MIB) object or other structured data structure, and may be stored on any suitable storage device such as one or more hard disk drives, memories, or any other electronic digital data recording device configured to store data. Although database 115 is depicted as a single element in FIG. 1, database 115 may span multiple devices located in one or more physical locations. For example, database 115 may be one or nodes located at a data warehouse(s).

Additionally, in one embodiment, database 115 may be located on the same device(s) as media server 105 and/or signaling server 120. Alternatively, database 115 may be located on a separate device(s) from media server 105 and/or signaling server 120.

Database 115 is communicatively connected to media server 105 and signaling server 120 using any wired and/or wireless connection, such as any combination of a LAN, a WAN, an internetwork, the Internet, or a company network. In one embodiment, database 105 is a relational database, a columnar database, or any other type of database. Database 105 may be of any size, portioned into any number of tables or other units, and may be organized in any suitable way. Database 105 stores and searches data records, such as stable bitrates and identifying information for media sessions.

In one embodiment, signaling server 120 is a signaling server used for establishing media sessions between a particular media server and a particular client device. Signaling server 115 may be any computing device, and may execute one or more applications, such as media application 110, to provide the functionality needed for the invention described herein. In particular, signaling server 115 includes functionality to initiate media sessions on behalf of media server and a client device. Signaling server 115 may use any protocols such as Session Initiation Protocol (SIP) (described in RFC 3261), Extensible Messaging and Presence Protocol (XMPP) as described in RFC 6120, Jingle as described XMP-0166[0] and XEP-0176[1], and/or any other suitable protocol to establish a media session.

As part of establishing a media session, signaling server 115 may receive requests from client devices, and determine an appropriate media server with which to connect the client device. The determination may be based on the load of the media servers, or the location of a particular media or data item the client wishes to access. An appropriate media server in different instances may be one hosting an audio or video conference. As part of establishing a media session, signaling server 115 sends data to client devices, such as identifying data for a media server with which to connect and/or a stable bitrate value. Identifying data for a media server may comprise an IP address and port number for the media server, for example.

In one embodiment client device 125 may be any computing device, including but not limited to: work stations, personal computers, general purpose computers, laptops, Internet appliances, hand-held devices, wireless devices, wired devices, portable or mobile devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, servers, racks, and the like. Although one client device 125 is shown in FIG. 1, any number of client devices may be present. Client device 125 is communicatively connected to media server 105 and signaling server 120 through any kind of computer network using any combination of wired and wireless communication, including, but not limited to: a LAN, a WAN, the Internet, or a company network. Client device 125 may include applications, software, and other executable instructions to facilitate various aspects of embodiments described herein, such as client media application 130. Client media application 130 is programmed to support video conferencing and/or audio conferencing. Client media application 130 may be stand-alone or may be implemented through a web browser using browser-executable code, and is a client version of media application 110. Optionally, client media application 130 includes all of the functionality discussed above in regards to media application 110, and/or may be a separate instance of media application 110.

In one embodiment, client media application 130 comprises program instructions that are programmed or configured to estimate bitrate and receive a stable bitrate. Client media application 130 may estimate bitrate in any suitable manner. If client media application 130 receives a stable bitrate, client media application uses the stable bitrate as a starting value in bitrate estimation when beginning a media session. If client media application 130 does not receive a stable bitrate, then client media application 130 uses a default value as a starting value in bitrate estimation when beginning a media session.

Example Functional Implementation

Figure 2:
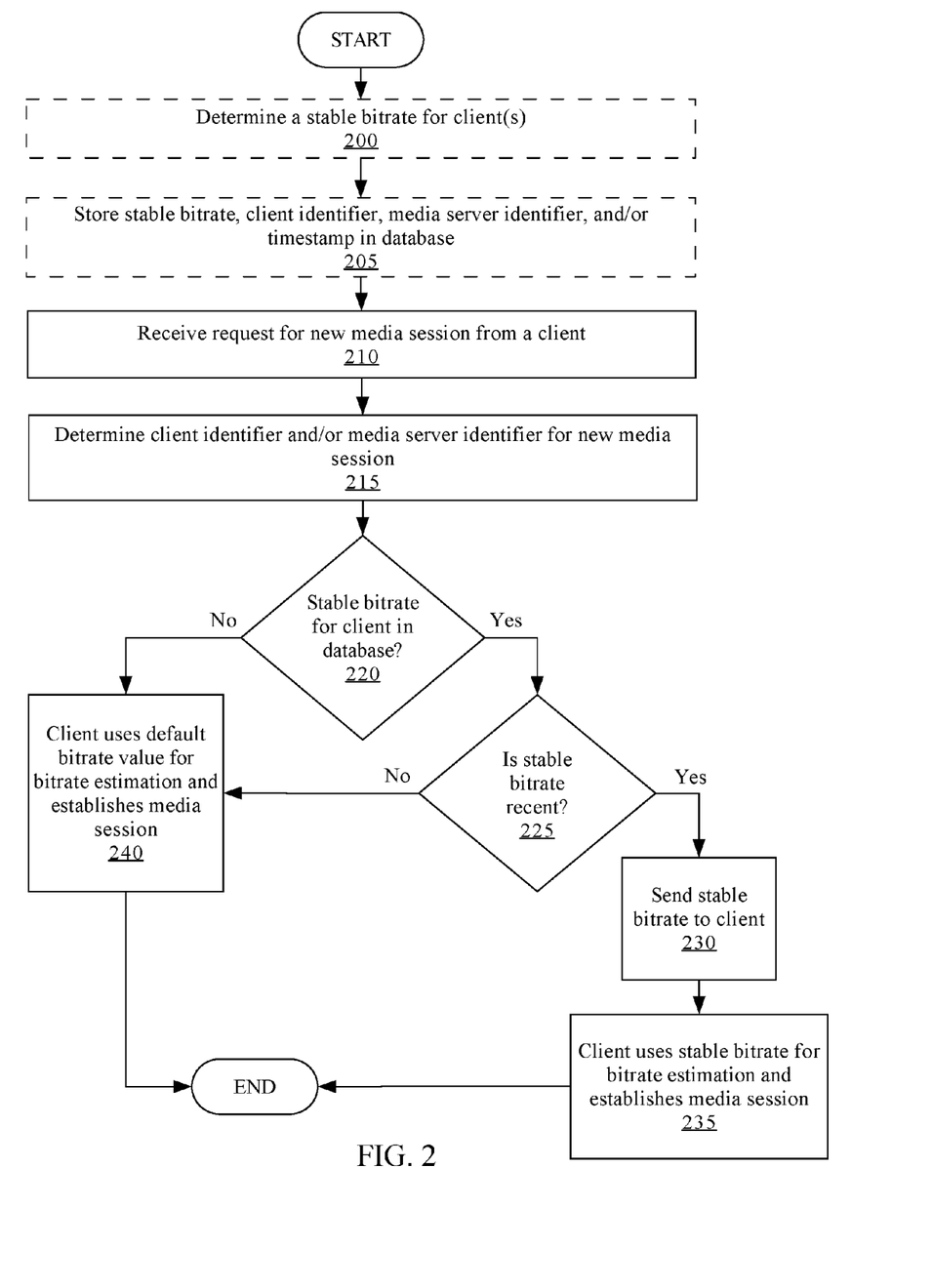
FIG. 2 illustrates a programmable algorithm or method in accordance with an embodiment.

FIG. 2 illustrates an example programmable algorithm or method for rapid optimization of media stream bitrate. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 200, a stable bitrate value is determined for a client. As indicated by the dotted lines, step 200 and step 205 may be performed before step 210 occurs, during a media session prior to the new media session requested in step 210. Step 200 may occur any amount of time in advance of step 210.

The stable bitrate value may be determined using the following formulas, as discussed above, where R is equal to the stable bitrate, BWE is the current bandwidth estimation, and C1, C2, and C3 are time periods.

1.) BWE>=R for the last C1 time;
2.) Actual Receiving Rate>=R for the last C2 time; and
3.) BWE has been non-decreasing for the last C3 time.

In the formulas, C1, C2, and C3 may be any amount of time, such as 10 seconds, 2 minutes, or any other suitable amount. Further, C1, C2, and C3 may be the same or different amounts of time, may vary dynamically, and are individually configurable by a user, administrator, programmer, or other suitable entity. Actual receiving rate refers to the actual rate at which packets and/or data is actual received in the media session. Alternatively, a stable bitrate may be determined by satisfying one of the above formulas, two of the above formulas, or using any other standard. Specifically, the stable bitrate may be determined by a media server.

In step 205, the stable bitrate value, client identifier, media server identifier, and/or timestamp are stored in a database in association with one another, for example, in column values in the same database record. The stable bitrate value and any additional information may be stored in association with one another in any manner or order. Optionally, more or fewer data items may be stored. Multiple instances or versions of a stable bitrate value for a given client may be stored, such multiple stable bitrates determined from different media sessions. As indicated by the dotted line, and discussed above, step 205 is performed prior to step 210, in a separate media session prior to the new media session discussed in step 210.

In step 210, a request for a new media session is received from a client. The request may be received in any manner, and may be for any type of media session, such as a video or audio conference, or other media stream. The request may be all or a portion of a payload in a digital data packet that is organized according to a media protocol or transport protocol.

In step 215, an identifier for the client and/or the media server for the new media session is determined. The identifier(s) may be determined using any suitable method. In one embodiment, the client identifier is extracted from data contained in the request, while the media server is selected based on factors such as load balancing and/or whether the media server can access a specific resource (such as the media server hosting a video or audio conference). For example, the client identifier may be extracted from a header or payload of a request or inferred from data values that appear in a packet, message or other transmission according to other protocols. The media server identifier is determined after a suitable media server has been identified for the request.

In step 220, a determination is made whether a stable bitrate value for the client exists in the database. This determination is made based on the results of a search of a database storing stable bitrates for client devices. A query, table lookup, or other form of search may be performed in the database, based on the identifier for the client. The search may be performed in any manner, and a match may be based on an exact match or a partial match. For example, if the identifiers used are IP addresses, and the search requires an exact match, the client IP address and the media server IP address need to match exactly to successfully locate a stable bitrate value. Alternatively, a partial match may only require that a portion of the IP addresses match, such as the first 24 bits of both the client IP address and the media server IP address, which may be termed a/24 match. Further, other restrictions may be placed on successfully returning a stable bitrate, as discussed in step 225. If there is not a stable bitrate for the client in the database, the method proceeds to step 240. If there is a stable bitrate for the client in the database, the method proceeds to step 225.

In step 225, a determination is made whether the stable bitrate value found in the database is recent. A stable bitrate value is determined to be recent if the timestamp associated with the entry in the database is within a threshold amount of time from a current time. The process may be programmed to read the current time from a system clock, determine a difference between the system clock value and the timestamp, and determine whether the difference is less than or equal to a specified threshold, which may be hard-coded or stored in a configuration file. For example, the threshold may be one week. Thus, if the stable bitrate value obtained from the database is more than one week old, then the stable bitrate is not recent, and would not be used. However, if the stable bitrate was four days old, then the stable bitrate would be determined to be recent and available for use. The threshold may be set to any suitable amount by a user, administrator, programmer, or other suitable entity, and may be changed dynamically based on any suitable factors.

If the stable bitrate is not recent, then the method proceeds to step 240. If the stable bitrate is recent, the method proceeds to step 230.

In step 230, the stable bitrate value is sent to the client device. The stable bitrate may be sent to the client device in any format, and with any additional information. For example, a signaling server may send the stable bitrate and an IP address of the selected media server to the client device so that the client device may subsequently connect to the media server.

In step 235, the client device uses the stable bitrate value for bitrate estimation and establishes the media session. Specifically, the client device uses the stable bitrate value in place of a default value for beginning bitrate estimation. When the media session is established, the client device will begin the media session initially sending data to the media server at the stable bitrate value, rather than a lower default bitrate value. Thus, the media server begins the media session receiving data at the stable bitrate. Therefore, a shorter amount of ramp up time will be needed, if any. The media session may be established in any manner.

In step 240, the client device uses a default bitrate value for bitrate estimation and establishes the media session. Specifically, the client device uses a default value for the beginning of bitrate estimation. The default value is a low value, and substantial ramp up time may be required. The media session may be established in any manner.

Using this process, the optimization of bitrate values in transmission of media streams is improved in client-server systems. Specifically, rather than using a standard default value, and waiting out the effects of a bitrate ramp-up algorithm, a particular client device is able to use a proven, previously stable, bitrate value as the starting point in bitrate estimation. This greatly reduces the ramp-up period for media sessions and can even completely remove the ramp-up when the stored stable bitrate is the same as the current stable bitrate for a given media session. This results in more efficient use of network bandwidth, use of fewer CPU cycles that otherwise would be needed to execute instructions of a ramp-up algorithm, and other technical benefits that may be evident from the disclosure as a whole.

Example Rapid Optimization of Media Stream Bitrate

Figure 3:
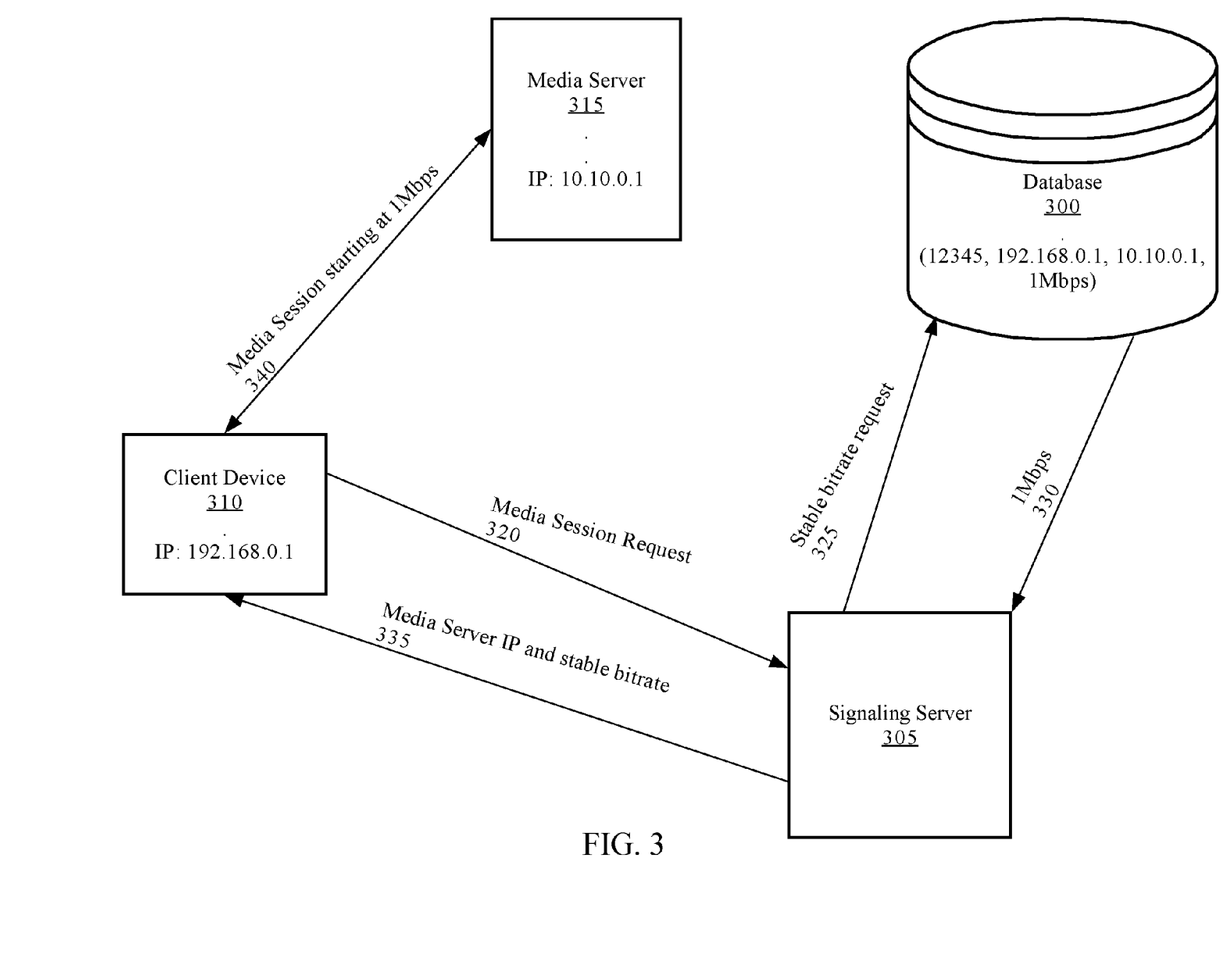
FIG. 3 illustrates an example implementation of rapid optimization of media stream bitrate.

FIG. 3 illustrates an example of rapid optimization of a media stream bitrate in accordance with an embodiment.

In the embodiment of FIG. 3, database 300 has stored information from a prior media session. Specifically, database 300 stores data indicating that the stable bitrate is 1 Mbps, the timestamp is 12345, the client IP address is 192.168.0.1, and the media server IP address is 10.10.0.1. Signaling server 305 is a signaling server that communicates with client devices that want to establish new media sessions. Client device 310 is a computer with an IP address of 192.168.0.1, and media server 315 is a server computer with an IP address of 10.10.0.1.

As an example, the client device 310 sends a media session request 320 to signaling server 305.

In response to the request, signaling server 305 requests a stable bitrate from database 300 via request 325, and provides the client device IP address (192.168.0.1) and the media server IP address (10.10.0.1) for use as search terms. After a search, database 300 locates the stable bitrate of 1 Mbps in a record that associates one or more of the client device IP address (192.168.0.1) and the media server IP address (10.10.0.1) with the value ("1 Mbps") and sends the stable bitrate to the signaling server in a result set at message 330.

The signaling server subsequently sends the media server IP address and the stable bitrate to client device 310 at operation 335.

At operation 340, the client device 310 uses 1 Mbps stable bitrate as the starting value for bitrate estimation, and the media server IP address to communicate with and establish a media session at 1 Mbps with media server 315.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and program logic to implement the techniques.

Figure 4:
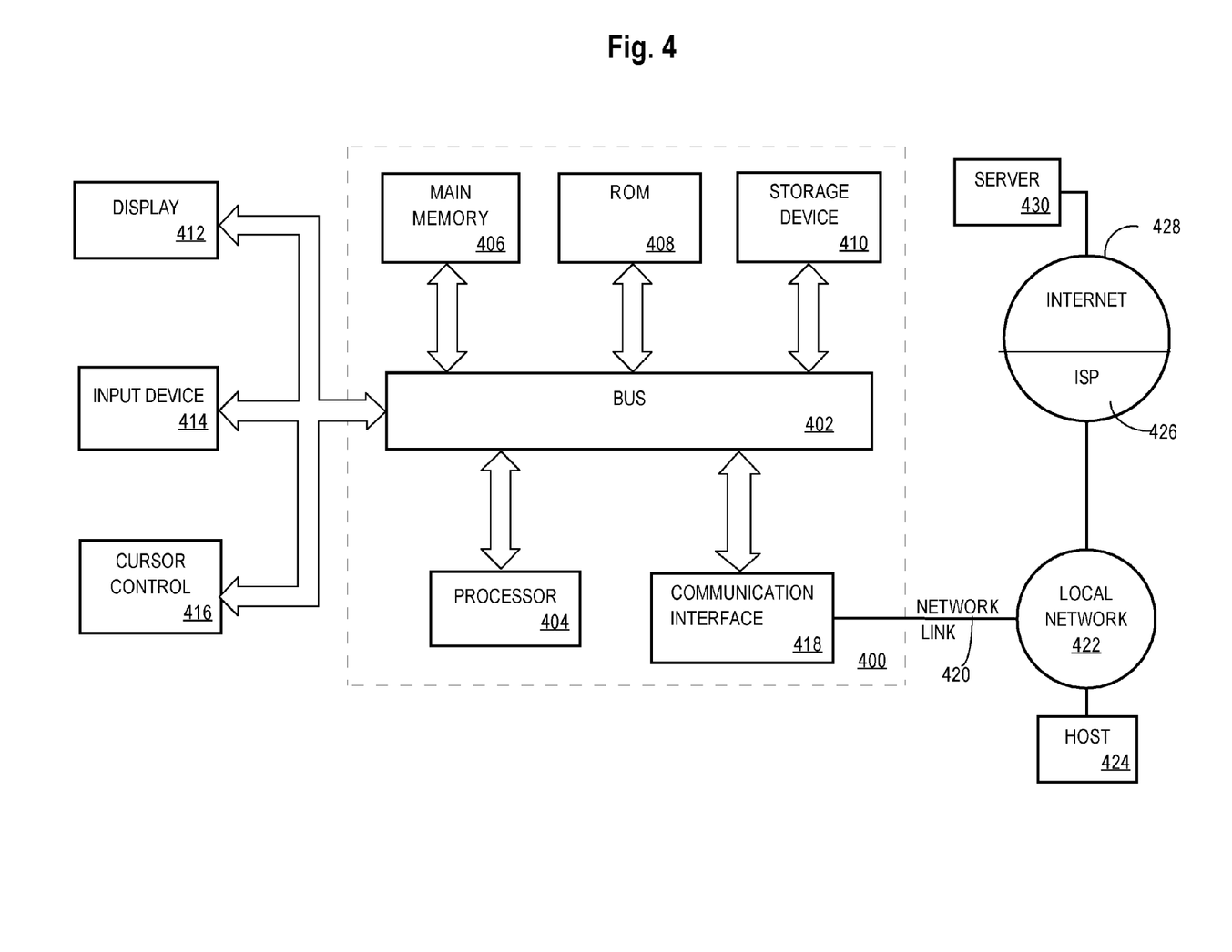
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and instructions that cause a machine to operation in a specific fashion. Such storage media may comprise non-volatile media and volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and stored in storage device 410, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
using a media server during a first media session between a client device and the media server, determining a stable bitrate value based on an actual rate at which the media server receives packets from the client device, the stable bitrate for use by the client device as an initial rate of transmitting multimedia data from the client device to the media server;
storing, in a database, the stable bitrate value for the client device in association with an identifier;
receiving, from the client device, a request to establish a second media session;
determining the identifier within the request;
in response to the request, based on the identifier in the request, searching the database for the stable bitrate value that is associated with the identifier;
in response to locating the stable bitrate value in the database and before receiving multimedia data from the client device, sending, by the media server, the stable bitrate value to the client device, wherein the client device estimates an initial bitrate for transmitting multimedia data from the client device to the media server in the second media session;
establishing, by the media server, the second media session;
receiving, initially and by the media server, multimedia data from the client device at the initial bitrate based on the stable bitrate.

2. The method of claim 1, wherein the media session is a video conferencing session.

3. The method of claim 1, wherein the identifier comprises an Internet Protocol (IP) address of the client device.

4. The method of claim 3, further comprising storing a media server IP address and a timestamp in the database in association with the identifier and the stable bitrate value.

5. The method of claim 4, wherein searching the database further comprises using a prefix of the media server IP address as a search key.

6. The method of claim 4, further comprising, in response to locating the stable bitrate value in the database, comparing the timestamp to a current time and determining that a difference of the timestamp and the current time is within a threshold.

7. The method of claim 1, wherein determining the stable bitrate value comprises:
  determining, by the media server, that a bandwidth estimation is equal to or greater than the stable bitrate value for a first time period;
  determining, by the media server, that an actual receiving rate is equal to or greater than the stable bitrate for a second time period;
  determining, by the media server, that the bandwidth estimation has not decreased for a third time period.

8. The method of claim 7, wherein the first time period, the second time period, and the third time period are 10 seconds.

9. A computer system comprising:
  a media server comprising one or more processors and electronic digital memory storing one or more sequences of instructions which, when executed by the one or more processors, cause the one or more processors to perform:
  during a first media session with a client device, determining a stable bitrate value based on an actual rate at which the media server receives packets from the client device, the stable bitrate for use by the client device as an initial rate of transmitting multimedia data from the client device to the media server;
  storing, in a database, the stable bitrate value for the client device in association with an identifier;
  establishing a second media session;
  receiving multimedia data from the client device at an initial bitrate based on the stable bitrate;
  a signaling server comprising one or more processors and electronic digital memory storing one or more sequences of instructions which, when executed by the one or more processors, cause the one or more processors to perform:
  receiving, from the client device, a request to establish a second media session;
  determining the identifier within the request;
  in response to the request, based on the identifier in the request, searching the database for the stable bitrate value that is associated with the identifier;
  in response to locating the stable bitrate value in the database and before receiving multimedia data from the client device, sending the stable bitrate value to the client device, wherein the client device estimates the initial bitrate for transmitting multimedia data from the client device to the media server in the second media session.

10. The system of claim 9, wherein the media session is a video conferencing session.

11. The system of claim 9, wherein the identifier comprises an Internet Protocol (IP) address of the client device.

12. The system of claim 11, the instructions, when executed, further causing the one or more processors to perform:
  storing a media server IP address and a timestamp in the database in association with the identifier and the stable bitrate value.

13. The system of claim 12, wherein searching the database further comprises using a prefix of the media server IP address as a search key.

14. The system of claim 12, the instructions, when executed, further causing the one or more processors to perform:
  in response to locating the stable bitrate value in the database, comparing the timestamp to a current time and determining that a difference of the timestamp and the current time is within a threshold.

15. The system of claim 9, wherein determining the stable bitrate value comprises:
  determining, by the media server, that a bandwidth estimation is equal to or greater than the stable bitrate value for a first time period;
  determining, by the media server, that an actual receiving rate is equal to or greater than the stable bitrate for a second time period;
  determining, by the media server, that the bandwidth estimation has not decreased for a third time period.

16. The system of claim 15, wherein the first time period, the second time period, and the third time period are 10 seconds.

* * * * *